Feb. 16, 1960 N. R. SCHWARTZ 2,925,294
SPRING LOADED SWIVEL JOINT
Filed March 19, 1957 3 Sheets-Sheet 1

INVENTOR.
NATHAN R. SCHWARTZ
BY
ATTORNEYS

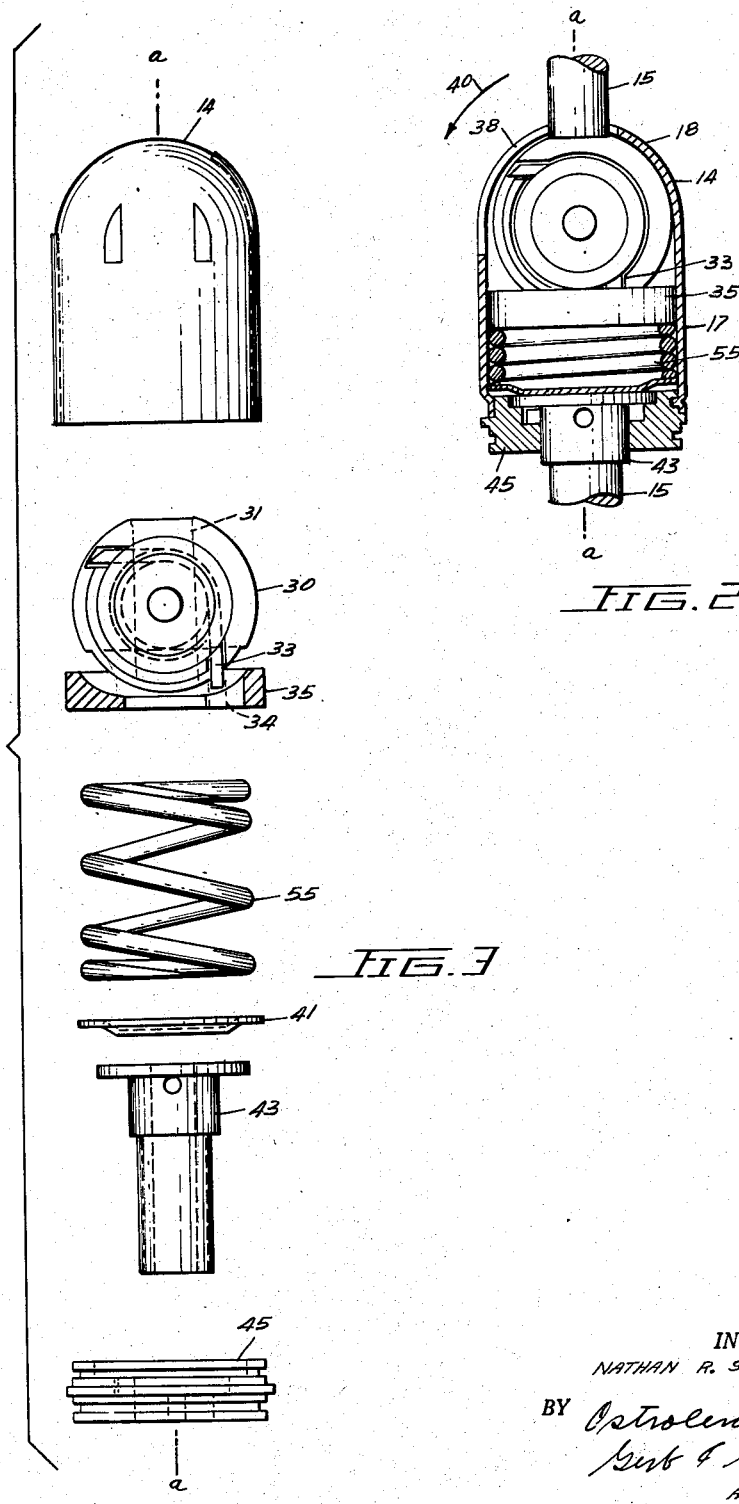

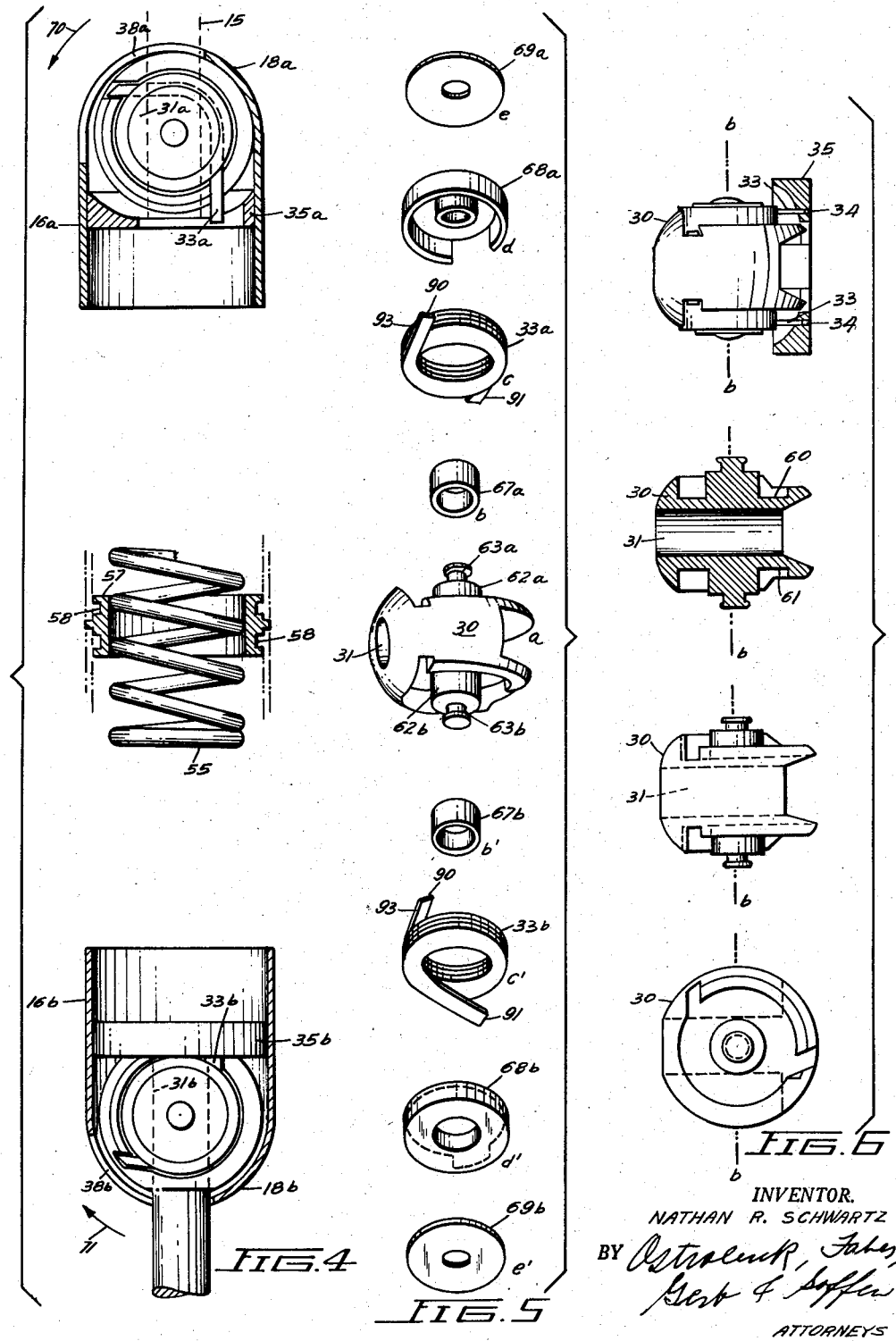

United States Patent Office 2,925,294
Patented Feb. 16, 1960

2,925,294

SPRING LOADED SWIVEL JOINT

Nathan R. Schwartz, Brooklyn, N.Y., assignor to Naras Research Inc., New York, N.Y., a corporation of New York Application March 19, 1957, Serial No. 647,098

10 Claims. (Cl. 287—92)

This invention relates to a swivel joint particularly suitable for use in connection with the load bearing arm of a lighting fixture and is a continuation-in-part of applicant's copending application Serial No. 396,864, filed December 8, 1953, now abandoned. More particularly, it relates to a counter-balanced swivel joint which is spring biased in such a manner as to aid in the movement of a load bearing arm in one direction and to hinder such movement in the opposite direction. The swivel joint of the present invention finds particular utility in connection with loads attached to relatively long moment arms.

Heretofore it has been a problem to provide a lighting fixture supporting means which will carry large loads on relatively long arms and at the same time would have a swivel joint which is readily adjustable by the user but is also firm enough so as not to be displaced by the weight of the load, especially when such loads are attached to relatively long supporting arms.

Accordingly, it is an object of the present invention to provide a swivel joint particularly suitable for use in connection with lighting fixtures in which it is desired to carry heavy but adjustable loads on relatively long supporting arms.

Another object of the present invention is to provide a swivel joint which is spring biased so as to be easily usable by the user but at the same time will resist unwanted movement which may be caused by the weight of the supported load.

These and other objects of my invention will become apparent from the following description when taken in connection with the drawings in which:

Figure 2 is a cross-sectional view of the counter-balanced swivel joint indicated as 14 in Figure 1.

Figure 3 is an exploded view of the swivel joint of Figure 2 showing how the components thereof may be assembled.

Figure 4 is an exploded view of a double swivel joint illustrated as the type 16 of Figure 1.

Figure 5 is an exploded view showing the assembly of one of the swivel balls illustrated in Figures 2, 3 and 4.

Figure 6 is a cross-section of a side view of the ball portion of the swivel joint illustrated in Figures 2 to 5 and showing in detail how such joint is engaged within a supporting washer.

Figure 1:
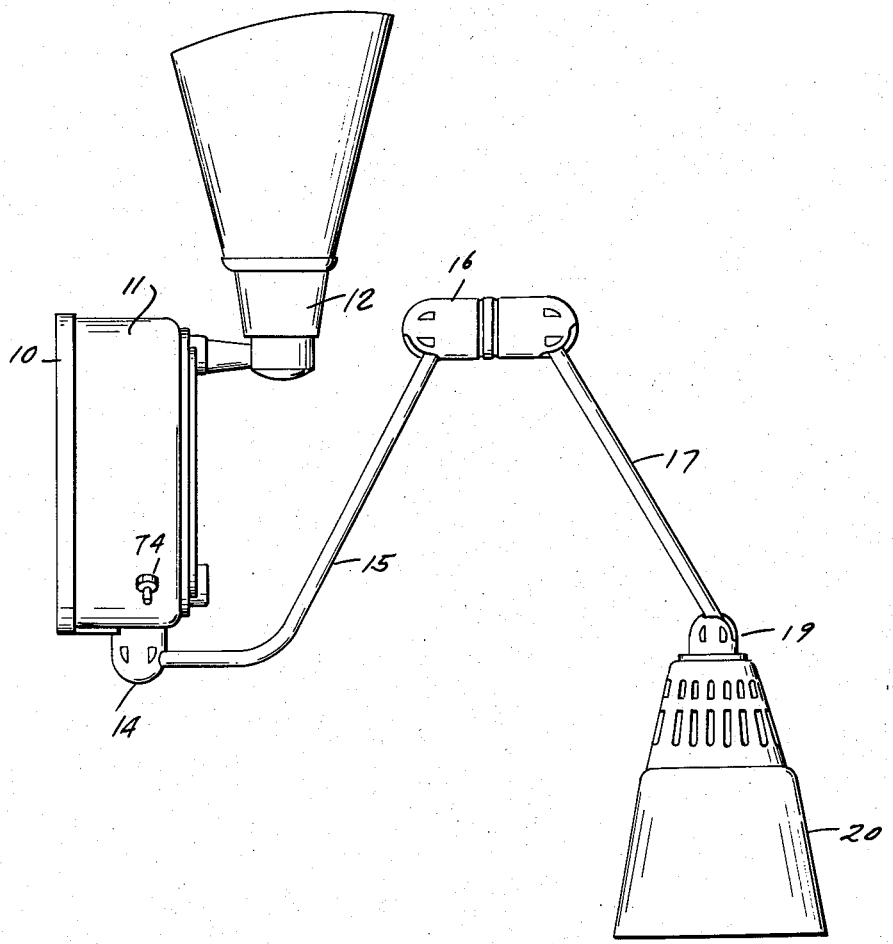
Figure 1 illustrates a commercial use of my novel swivel joint wherein both a single and double joint of the type herein described is effectively utilized.

Essentially, the present invention involves a counter-balanced swivel joint encased in a suitable housing, which swivel joint comprises a swivel ball having seated on opposite sides thereof a coil spring, the ends of each of said coil springs extending from the ball and being engaged within a washer. The swivel ball is provided with a bore normal to the axis of the coil spring into which the supporting arm may be inserted so that angular movement of the supporting arm will create a tension on the coil springs, the legs of which will be firmly secured within the washer.

The swivel joint constructed in this fashion thereby provides an effective means whereby in moving the load bearing arm in one direction, a tension is being applied against the spring and additional resistance is encountered, while, when moving the load-bearing arm in the opposite direction, the spring is returned to its normal state and in so doing provides additional force for this movement of the arm.

This type of joint finds particular utility in a fixture of large moment arm, an example of which is found in my copending application Serial No. 576,056, filed April 4, 1956. This type of unit is shown in Figure 1 which illustrates a wall type adjustable reading light which is supported by a mounting ring 10 covered by canopy 11 which in turn has extending therefrom an indirect lighting unit 12. Also extending from the canopy is a swivel joint of the type herein described, illustrated as 14. Through the use of the novel counter-balancing feature hereinafter discussed, the user may then have the spring action of the swivel joint assist him in raising arm 15, while at the same time, offer a considerable resistance against any unwanted downward movement of this arm due to the load of the lamp 20.

Similarly, a double swivel joint 16 of the type illustrated in Figure 5 may be used so that the spring biasing in the joint promotes the raising of the arm 17 and opposes the straightening of arm 15.

Referring now to Figures 2 to 6 in more detail, and first to Figure 2, it can be seen that the swivel joint of the present invention is urged within a housing 14 by an axially biased spring member 16. The housing has a cylindrical side 17 and a rounded portion 18. A swivel ball 30 has a substantially spherical shape and carries therethrough a cylindrically opening 31.

The detailed construction of the swivel ball is hereinafter referred to in connection with the description of Figures 5 and 6. Suffice it to say for the present that there is extending from said swivel ball a pair of flattened helically wound springs having legs 33 which are engageable into the slots 34 of a cup-shaped washer 35. The washer is spring biased toward the apex of the housing 14 so that the ball is urged into the spherical portion thereof. The said spherical portion is provided with a slot 38 extending for about 90° so as to allow the arm 15 to rotate to this extent.

In Figure 2 as the arm 15 is urged counterclockwise in the direction of the arrow 40 the leg 33 of the spring mounted on the swivel ball being engaged within the washer 35 is not allowed to move and, therefore, the spring members are put in tension and it becomes relatively difficult to move the arm 15 in the direction 40. As shown in Figure 1 this would correspond to a downward thrust on the arm so that the spring tension will be such as to resist downward movement of the arm and assist upward movement thereof.

The spring 55 rests against a suitable washer 41 which is in turn engaged by a hollow generally cylindrical member 43 over which may be fitted a further washer 45. The cooperation between washer 45 and 43 provides the necessary rotative movement of the joint around the axis $a$—$a$. This rotative movement may be made more or less than the 360° desired by various means well known to those skilled in the art. The washer 45 and tubular member 43 may, if desired, be fitted to the desired light fixture or mounting such as the canopy 11 shown in Figure 1.

Figure 4 is another embodiment of the type of swivel joint in Figure 2 in which a pair of joints of this type are mounted within a common housing of the type shown as 16 in Figure 1. In this case the housing has two joinable sections 16a and 16b terminating respectively in ends 18a and 18b which carry 90° openings 38a and 38b, respectively. The hollow cylindrical arms 15 and 17 entering the joint from either direction may terminate at the housing and cylindrical openings 31a and 31b act as the extensions thereof. Thus, there is always an opening through the joint for the passage of appropriate electrical wiring.

Each of the ball joints shown in Figure 4 may carry on opposed surfaces thereof spring members 33a and 33b, the legs of which are secured within washers 35a and 35b, respectively. These washers are urged into the rounded end of each of the respective housings by means of spring 55 which passes through washer member 58 having a suitable cylindrical opening therein for accommodating the said spring. The washer 57 carries external threads 58 and is interposed between the two sections of the housing 16, so that the sections are readily joined by crimping the outer edges of their cylindrical surfaces into these threads.

Referring now in detail to Figures 5 and 6 it can be seen that the ball 30 having cylindrical opening 31 carries a pair of recessed seats 60 and 61 on opposite surfaces thereof which are concentric to the axis b—b of said ball. The cylindrical extensions 62 and 63a and b, respectively, form the recessed seat. The larger cylindrical extensions 62 are fitted with bearing members 67a and b, respectively, which prevent friction between the spring members 33 and the shaft 62.

The springs are covered by a pair of caps 68a and 68b, respectively, to prevent scraping of the spring upon loading or unloading. The ring-like member 69a and b, respectively, confine the spring so as to prevent it from thrusting outwardly when it is tensed.

After the parts are assembled in the order indicated in Figure 7 the head of shafts 63a and b are peened over and the entire assembly is held in place.

It can be seen from the above that the legs of the springs 33 which extend axially with respect to the cylindrical opening in the ball and enter slots 34 of the cup-shaped washer, are retained thereby so that upon rotation of the arm engaged with the housing in the counterclockwise direction 70 or the clockwise direction 71 indicated in Figure 4, it becomes tense and resists movement in this direction. As is shown in the embodiment of Figures 2 and 3, the spring is placed so as to resist downward movement and assist upward movement. Thus, arms 15 and 17 of Figure 1 would extend into the swivel ball from the directions indicated in Figure 4. The helical spring member 33 may carry two extensible legs 90 and 91, respectively, although in the present invention only one of these legs is utilized and is engaged in slot 34 of the cup-shaped washer 35.

The spring comprises a flattened helically wound resilient material in the flat surface substantially normal to the plane of the coil and the tension which is created upon movement of the moment arm is a tangential tension acting against the narrow edge 93 of the spring. Of course, the specific design of a given spring may be varied in accordance with the degree of tension desired.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A counter-balanced swivel joint comprising a swivel ball having a bore therethrough and seating means on opposite sides thereof, a coil spring mounted within each of said seats the axis of said springs being normal to the axis of the bore, the ends of each of said springs having legs extending from said ball, and slotted washer means for seating said ball and for engaging the legs of said springs.

2. A counter-balanced swivel joint comprising a swivel ball, a cylindrical opening through the center of said ball, and normal to the axis thereof, recessed seating means on opposite sides of said ball; a flattened, helical coil spring mounted within each of said seating means the axis of said springs being normal to the axis of the cylindrical opening, the ends of each of said springs having legs extending tangentially from one end of the ball, and a cup-shaped washer having slots on the cupped surface thereof for seating said ball and for engaging the legs of said springs.

3. In a fixture support having a load-bearing arm, a counter-balanced swivel joint spring biased so as to tend to raise said arm and to provide resistance in lowering said arm, said joint comprising a housing, a swivel ball urged within said housing, seating means on opposite sides of said swivel ball, a coil spring mounted within each of said seats, the ends of each of said springs providing legs extending from one end of the ball and washer means for seating said ball and for engaging the legs of said springs.

4. In a fixture support having a load-bearing arm, a counter-balanced swivel joint spring biased so as to tend to raise said arm and to provide resistance in lowering said arm, said swivel joint comprising a housing having a slot extending from its apex to a point therebelow, a swivel ball in said housing, said swivel joint comprising a swivel ball, a cylindrical opening through the center of said ball and normal to the axis thereof, recessed seating means on opposite sides of said ball and concentric to the axis thereof; a coil spring mounted within each of said seating means, the ends of each of said springs having legs extending from one end of the ball, and a cup-shaped washer having slots on the cupped surface thereof for seating said ball and for engaging the legs of said springs.

5. A counter-balanced swivel joint comprising a housing comprising a pair of opposed sections, each of said sections being cylindrical in cross-section and having one open end and one rounded end, said open ends being in aligment with and rigidly secured to each other, a swivel ball within the rounded portion of each of said housing sections, each of said swivel balls having on opposite sides thereof, a coil spring, each of said springs having legs extending from the ball; cup-shaped washer means located within the cylindrical section of the respective housing sections for engaging the ends of said legs, a single spring for urging each of said cup-shaped washers against said swivel balls and concentric with and surrounding said springs, washer means interposed between said housing sections.

6. A counter-balanced swivel joint comprising a housing having one open end and one rounded end, said housing being generally cylindrical in cross-section and within said open ends, a swivel ball, said swivel ball having a cylindrical opening longitudinal with respect to said housing and, on opposite transverse faces thereof, a coil spring, the coil spring on each face thereof being seated within said ball and having a pair of legs extending therefrom in a direction towards the open end of said housing, slotted, cylindrical, cup-shaped washer means for engaging the ends of said legs, said washer means being urged against said ball by spring means within the cylindrical section of said housing.

7. In a fixture support having a load-bearing arm, a counter-balanced swivel joint spring biased so as to tend to raise said arm and to provide resistance in lowering said arm, said joint comprising a housing, a swivel ball urged within said housing, seating means on opposite sides of said swivel ball, a coil spring mounted within each of said seats, said spring comprising a flattened, helically wound, resilient member, in which the flat surface thereof is substantially normal to the axis of the coil formed by the said spring, the ends of each of said springs providing legs extending from one end of the ball and washer means for seating said ball and for engaging the legs of said springs.

8. In a fixture support having a load-bearing arm, a counter-balanced swivel joint spring biased so as to tend to raise said arm and to provide resistance in lowering said arm, said swivel joint comprising a housing having a slot extending from its apex to a point therebelow, a swivel ball in said housing, said swivel joint comprising a swivel ball, a cylindrical opening through the center of said ball and normal to the axis thereof, recessed seating means on opposite sides of said ball and concentric to the axis thereof; a coil spring mounted within each of said seating means, said spring comprising a flattened, helically wound, resilient member, in which the flat surface thereof is substantially normal to the axis of the coil formed by the said spring, the ends of each of said springs having legs extending from one end of the ball, and a cup-shaped washer having slots on the cupped surface thereof for seating said ball and for engaging the legs of said springs.

9. A counter-balanced swivel joint comprising a swivel ball having a bore therethrough and seating means on opposite sides thereof, a coil spring mounted within each of said seats, the axis of said springs being normal to the axis of the bore, the ends of each of said springs having legs extending from said ball and means for seating said ball and for engaging the legs of said springs.

10. In a fixture support having a load-bearing arm, a counter-balanced swivel joint spring biased so as to tend to raise said arm and to provide resistance in lowering said arm, said joint comprising a housing, a swivel ball urged within said housing, seating means on opposite sides of said swivel ball, a coil spring mounted within each of said seats, the ends of each of said springs providing legs extending from one end of the ball and means for seating said ball and for engaging the legs of said springs.

References Cited in the file of this patent
UNITED STATES PATENTS

| | | |
|---|---|---|
| 2,042,248 | Charter et al. | May 26, 1936 |
| 2,298,176 | Schwartz | Oct. 6, 1942 |
| 2,460,880 | Geiger et al. | Feb. 8, 1949 |
| 2,469,425 | Andersen | May 10, 1949 |
| 2,542,567 | Peters | Feb. 20, 1951 |
| 2,742,808 | Haberle | Apr. 24, 1956 |
| 2,822,550 | Grodzki | Feb. 11, 1958 |